Patented Feb. 12, 1929.

1,702,104

UNITED STATES PATENT OFFICE.

HENRY BLUMENBERG, JR., OF LOS ANGELES, CALIFORNIA.

FILTERING MATERIAL.

No Drawing. Application filed August 10, 1927, Serial No. 212,130. Renewed December 22, 1928.

My invention relates to a filtering material especially adapted for the filtration, bleaching and deodorizing of mineral oil products, such as gasoline, kerosene and the like. It is also suitable for the treatment of water, industrial waste waters and sewerage.

It is an object of this invention to provide a filtering material in which a hypochlorite is associated with other ingredients which prevent the decomposition of the filtering material while it is being shipped and which will also prevent the hypochlorite, such as calcium hypochlorite, from becoming colloidal, which tendency interferes with the percolation of the liquid to be treated.

My invention consists of the composition of matter hereinafter described and claimed.

I take calcium hypochlorite—$Ca(OCl)_2$ and mix the same with from five to ten percent of sodium carbonate—$Na_2CO_3$. The sodium carbonate will prevent the moisture from reacting with the calcium hypochlorite and thus prevent decomposition of the latter and the disagreeable odor due to such decomposition. To the mixture of the calcium hypochlorite and the sodium carbonate I add about seventy (70) percent, by weight, of diatomaceous earth, and thoroughly mix the ingredients together, the ingredients having previously been ground to a fineness of 20–100 mesh screen. The proportion of diatomaceous earth to the calcium hypochlorite may vary greatly though, as stated, I prefer to use about seventy (70) percent by weight.

In place of the diatomaceous earth other inert cellular material may be substituted, such as asbestos, clays, charcoal, wood fibre and the like, though the diatomaceous earth is preferred.

In the treatment of mineral oil distillates from one to five percent by weight of the oil to be treated is used, in the treatment of water from 25 to 50 pounds per million gallons, and in the treatment of industrial waste waters and sewerage from 100 to 500 pounds per million gallons are usually sufficient.

The liquids to be treated are either passed under pressure through a layer of the filtering material or allowed to percolate by gravity. The diatomaceous earth prevents the calcium hypochlorite from becoming colloidal, which is objectionable because it interferes with the percolation of the liquid.

Various changes may be made by those skilled in the art without departing from the spirit of my invention as claimed.

I claim:

1. A filtering material comprising calcium hypochlorite, a small percentage of sodium carbonate, and a substantial amount of an inert cellular material.

2. A filtering material comprising calcium hypochlorite, from five (5) to ten (10) percent of sodium carbonate, and about seventy (70) percent of diatomaceous earth.

In testimony whereof I have signed my name to this specification.

HENRY BLUMENBERG, JR.